United States Patent [19]
Faries et al.

[11] 3,766,466
[45] Oct. 16, 1973

[54] DEVICE FOR SIMULTANEOUSLY Q-SWITCHING SEVERAL INDEPENDENT RUBY LASERS

[75] Inventors: Dillard W. Faries, Glen Ellyn, Ill.; Yuen R. Shen, Berkeley, Calif.

[73] Assignee: The United States of America as represented by the Secretary of the Navy, Washington, D.C.

[22] Filed: Nov. 26, 1971

[21] Appl. No.: 202,444

[52] U.S. Cl. .............................................. 331/94.5
[51] Int. Cl. ............................................... H01s 3/11
[58] Field of Search .................................. 331/94.5

[56] References Cited
UNITED STATES PATENTS

| | | | |
|---|---|---|---|
| 3,701,048 | 10/1972 | Jennings, Jr. ...................... | 331/94.5 |
| 3,416,097 | 12/1968 | Simpson ............................. | 331/94.5 |
| 3,486,129 | 12/1969 | Van Tran et al. .................. | 331/94.5 |
| 3,541,468 | 11/1970 | Hammond, Jr. et al. ........... | 331/94.5 |

Primary Examiner—William L. Sikes
Attorney—R. S. Sciascia et al.

[57] ABSTRACT

An apparatus which will simultaneously Q-switch several independent ruby lasers is used to beat the several laser outputs together. The Q-switching function is achieved by rotating a single rooftop prism which is in optical alignment with each of the lasers. The several lasers are tuned to differing frequencies, a difference frequency signal being obtained by beating the two signals together.

3 Claims, 2 Drawing Figures

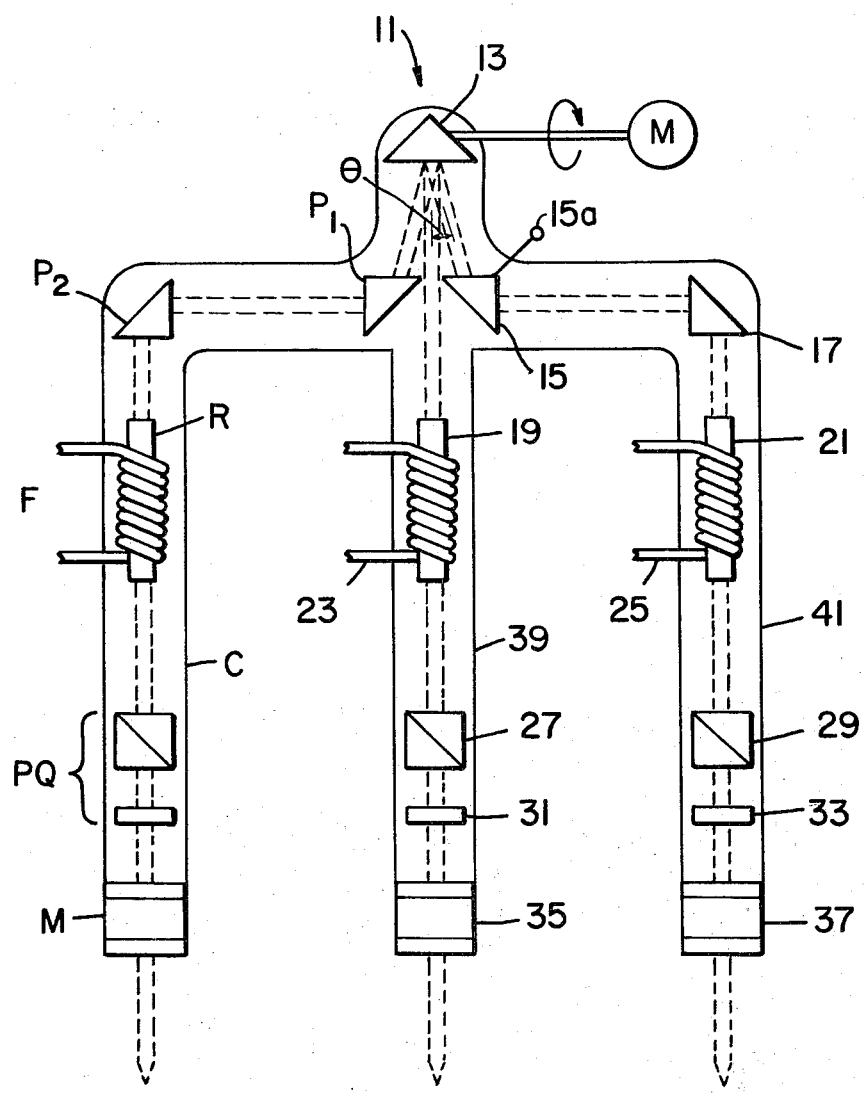
FIG_1
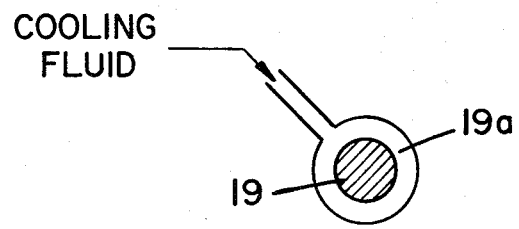
FIG_2

3,766,466

DEVICE FOR SIMULTANEOUSLY Q-SWITCHING SEVERAL INDEPENDENT RUBY LASERS

BACKGROUND OF THE INVENTION

1. Field of the Invention

This invention relates generally to a new means for simultaneously Q-switching at least two independent ruby lasers, and more particularly, to a means for beating the outputs of several ruby lasers in a crystal, or the like, to obtain an output signal.

Description of the Prior Art

Although the intense flash light has been used in nonlinear optical devices, its intensity at a given frequency is generally much less than in a laser device. Even though there is no difficulty to generate two cw lasers simultaneously in a medium, the frequency tunability is for all practical purposes nonexistent and the cw lasers are comparatively much less intense than pulsed lasers. For pulsed lasers the frequency tunability is larger than cw lasers, but the synchronization of the lasers is very difficult.

SUMMARY OF THE INVENTION

Briefly, the present invention comprises an apparatus for simultaneously Q-switching several independent ruby lasers, thus making it possible to beat together the output of the two independent ruby lasers. The Q-switching function is achieved by rotating a single rooftop prism which is in optical alignment with each of the lasers. The several lasers are tuned to differing frequencies, a difference frequency signal being obtained by beating the two signals together.

The present invention overcomes the aforementioned difficulties by providing a device which will simultaneously Q-switch at least two lasers with indpendent frequency tuning for each laser.

STATEMENT OF THE OBJECTS OF INVENTION

A primary object of the present invention is to provide a means to generate a difference frequency between two ruby lasers.

Another object of the present invention is to provide a tunable, coherent source of radiation.

Other objects, advantages and novel features of the invention will become apparent from the following detailed description of the invention when considered in conjunction with the accompanying drawings.

BRIEF DESCRIPTION OF THE DRAWINGS

FIG. 1 is an illustration of the tunable far infrared ruby generation device; and FIG. 2 is a schematic diagram of the glass encased ruby rod illustrated in FIG. 1. DESCRIPTION OF THE PREFERRED EMBODIMENT Briefly, the apparatus described below is capable of simultaneously Q-switching several independent ruby lasers. Frequency tuning in the system is accomplished by variation of the temperature of the ruby rods and by selective Q-switcing of either $R_1$ or $R_2$ ruby transitions, hereinafter referred to as $R_1$ and $R_2$. The tuning range has a frequency difference from about 0 to about $50 cm^{-1}$.

Referring to FIG. 1, the apparatus 11 comprises a rotating rooftop prism 13; prisms 15 and 17; ruby rods 19 and 21; flash lamps 23 and 25; resonant reflectors 35 and 37; polarizers 27 and 29; quartz plates 31 and 33. These constitute the two laser cavities 39 and 41. Ruby laser rods 19 and 21 may have different dimensions. For example, rod 19 is 8.25cm × 0.64cm while rod 21 is 10.3cm × 0.95cm.

Referring to FIG. 2, laser rods 19 and 21 are surrounded by glass gleeves 19a and 21a (not illustrated) thorugh which a cooling fluid can be circulated. Ethyl alcohol or any similar liquid may be used as the coolant. It is possible to vary the lasing frequency by cooling one of the laser rods down to the temperature of liquid nitrogen or less while operating the other laser at about room temperature. The difference of lasing frequencies at room temperature and at −50° C is about $9cm^{-1}$ and the difference between room temprature and liquid nitrogen temperature is $27cm^{-1}$. The difference frequency can be extended by requiring the laser at lower temperature to lase on the $R_2$ transistions. This can be done by suppression the $R_1$ transitions. In the present invention a polarizer 27 and a birefringent crystal (quartz plates 31) are inserted in the cavity 39 to perform the desired function. The birefringent crystals have a specific length and orientation so that they act as one-fourth wave plate to the $R_1$ frequency and a one-half wave plate to the $R_2$ frequency. Consequently, only the $R_2$ radiation can make a roundtrip in the cavity 39 without appreciable attenuation by the polarizer 27 and the laser therefore lases at the $R_2$ frequency. The polarizer 29 and quartz plate 33 can serve the same purpose in cavity 41.

The $R_2$ transitions have essentially the same temperature dependence as the $R_1$ transitions. At room temperature the difference between $R_1$ and $R_2$ frequencies is usually about $29cm^{-1}$.

By using the same rotating prism 13 in both optical cavities the lasers 19 and 21 are simultaneously Q-switched. Q-switching of lasers 19 and 21 is achieved by continually rotating prism 13. When any ray enters the broad face of a right angle prism, such as prisms 15 and 17, in the plane perpendicular to the roof edge, it is reflected back parallel to itself. This special property of a rooftop prism allows the system to Q-switch many independent lasers simultaneously, as illustrated by the third set of lasing elements in FIG. 1. The angle of incidence at which the ray can be reflected is limited by the angle for total internal reflection in prism 13. This limitation can be alleviated by using a dielectric coating on the rooftop of prism 13. The mode purity can be controlled by using a saturable dyecell, containing a dye, such as an Eastman 10,220. One of the lasers is cooled while the other is operated at room temperature, as described above. The two lasers' output beams are made coincident and accurately parallel, within about 1 minute of arc, by careful adjustment with a beam splitter or any other equivalent device. The polarizations of the lasers are made accurately perpendicular, both in the vertical and the horizontal planes, by the use of external polarizers. Each laser delivers several megawatts of power with a pulse duration of about $3 \times 10^{-8}$ sec. To obtain a difference of frequency tunability of $0-50cm^{-1}$ the laser should be cooled down to the temperature of liquid nitrogen. The system using dry-ice cooling has an accurate tuning range of about $0-9cm^{-1}$ and from about $20cm^{-1}$ to about $38cm^{-1}$.

Referring back to FIG. 1, the independent light paths $L_1$ and $L_2$ of the lasers 19 and 21 are both centered at the rooftop prism 13 at an angle $\theta$ to each other. The rooftop rotating prism 13 is rotated about the horizontal axis with its roof edge perpendicular to the axis of rotation so that if the lasers are pumped, Q-swtching of the lasers will begin when the roof edge of rotating prism 13 reaches positions perpendicular to the light paths of the lasers. The far infrared difference frequency signals are found to be proportional to the sum frequency signals. Simultaneous Q-switching of the two lasers 19 and 21, when the light paths of both lasers are in the horizontal plane, is possible. However, since the two laser cavities are not identical, synchronization of the two Q-switched pulses could still be slightly off. Accordingly, a fine adjustment of the relative timing of the two Q-switched pulses is required. This function can be performed by tilting stationary prism 15. This has the unique advantage of not affecting the direction of the outgoing laser beam. With the adjustment screw unit 15a a fine tuning of less than 1 nanosecond in relative timing can be achieved. It should be noted that a motor driven unit, or any similar unit, may be used to rotate the rotating rooftop prism 13. The present scheme can be easily extended to a system which involves simultaneously Q-switching of more than two lasers, as illustrated in FIG. 1.

In order to avoid possible mechanical vibration, the rotating prism may be mounted with shock absorbers on a steel column and separated from the rest of the laser system.

The unique system described above has been applied successfully to the investigation of far infrared difference frequency generation by optical beating in a non-linear crystal.

What is claimed is:

1. A device for simultaneously Q-switching at least two independent ruby lasers comprising in combination:
   a. a first means for generating a first laser beam having first and second ends;
   b. a second means for generating a second laser beam having first and second ends;
   c. a rotatable roof-top prism having a roof-edge, said roof-edge having a face, said face is parallel to the axis of rotation of said prism;
   d. said prism being located in longitudinal alignment with said first laser means;
   e. said second laser being spaced apart from said first laser means;
   f. said first laser means is aligned so that said first laser beam is centered on the face of said prism when the face of said prism is positioned opposite said first end of said first laser means;
   g. said first laser means and said second laser means are aligned so that said first laser beam emitted from said first laser means and said second laser beam emitted from said second laser means are aligned parallel with one another;
   h. a means for refracting said second laser beam from its parallel alignment with respect to said first laser beam to center said laser second beam on the face of said prism whereby said second laser beam from said first end of said second laser is centered on the face of said prism when the face of said prism is positioned in longitudinal alignment with said first laser.
   i. a first means for varying the temperature of said first laser means and a second means for varying the temperature of said second laser means said first temperature varying means maintains said first laser means at about the temperature of liquid nitrogen while said second temperature varying means maintains said second laser means at about room temperature;
   j. a first reflector having a first reflecting surface located at the second end of said first laser means for generating said first laser beam, said first reflector is algined so that first laser beam generated from said second end of said first laser generating means is reflected from said first reflecting surface back parallel to itself and towards said second end of said laser generating means;
   k. a second reflector having a second reflecting surface located at said second end of said second laser means for generating said second laser beam said second reflector is aligned to that said second laser beam generated from said second end of said second laser generating means is reflected from said second reflecting surface back parallel to itself and towards said second end of said second laser generating means wherein said roof-top prism simultaneously reflects said first laser beam back in parallel with itself and said second laser beam back in parallel with itself when the face of said prism is positioned perpendicular with the longitudinal axis of said first laser means.

2. The device recited in claim 1 wherein said first laser means and said second laser means are ruby laser rods aligned so that the longitudinal axis of said first laser rod is parallel with the longitudinal axis of said second laser rod.

3. The device recited in claim 1 wherein said means for refracting said second laser beam comprises a first prism and a second prism and a means for adjusting the relative timing between said second laser beam and said first laser beam said means for adjusting the relative timing is connected to said second prism to synchronize the timing between said second laser beam and said first laser beam said first prism positioned in longitudinal alignment with said first end of said second laser means said first prism refracting said second laser beam at a right angle and perpendicular to the original path of said second beam and towards said first laser beam said second prism is located in the direct path of the refracted said second laser beam said second prism is aligned so that said second laser beam is reflected upon the face of said roof-top prism when the face of said roof-top prism is positioned in the direction of said first end of said second laser means and in longitudinal alignment with said first end of said first laser means.

* * * * *